(12) United States Patent
Rogers

(10) Patent No.: US 7,130,496 B2
(45) Date of Patent: Oct. 31, 2006

(54) OPTICAL FIBRE BACKSCATTER POLARIMETRY

(75) Inventor: Alan John Rogers, Bookham (GB)

(73) Assignee: University of Surrey, Surrey (GB)

( * ) Notice: Subject to any disclaimer, the term of this patent is extended or adjusted under 35 U.S.C. 154(b) by 171 days.

(21) Appl. No.: 10/476,654

(22) PCT Filed: May 9, 2002

(86) PCT No.: PCT/GB02/02138

§ 371 (c)(1),
(2), (4) Date: Feb. 23, 2004

(87) PCT Pub. No.: WO02/095349

PCT Pub. Date: Nov. 28, 2002

(65) Prior Publication Data

US 2004/0136636 A1    Jul. 15, 2004

(30) Foreign Application Priority Data

May 18, 2001    (GB)    .................................... 0112161

(51) Int. Cl.
*G02B 6/00*    (2006.01)
*H04B 10/08*    (2006.01)
*H04B 17/00*    (2006.01)

(52) U.S. Cl. ............................. 385/11; 385/12; 398/29; 398/81

(58) Field of Classification Search .................. 385/11, 385/12, 27, 28, 88, 123, 124, 129–131; 398/29, 398/81
See application file for complete search history.

(56) References Cited

U.S. PATENT DOCUMENTS 4,840,481 A * 6/1989 Spillman, Jr. ................ 356/32
4,944,571 A * 7/1990 Rogers ............................ 385/1

OTHER PUBLICATIONS

Rogers, A.J. (1980). "Polarisation optical time domain reflectometry," *Electronics Letts*. 16(13): 489-490.
Rogers, A.J. (1981). "Polarisation-optical time domain reflectometry: a technique for the measurement of field distributions," *Applied Optics*, 20:1060-1074.
Rogers, A.J. (1988). "Optical-fibre current measurement," *Int. J. Optoelectronics* 3(5):391-407.
Rogers, A.J. et al. (1995). "Vibration Immunity for Optical-Fiber Current Measurement," *J. Lightwave Tech*. 13(7):1371-1377.
Rogers, A.J. et al. (1997). "Computational polarization-optical time domain reflectometry for measurement of the spatial distribution of PMD in optical fibers," OFMC '97, 4th Optical Fibre Measurement Conference, Conference Digest, OFMC '97, Teddington, UK, pp 126-129.
Ellison, J.G. et al. (1998). "A Fully Polarimetric Optical Time-Domain Reflectometer," *IEEE Photonics Tech. Letts.*, IEEE Inc., New York, vol. 10(2):246-248.

(Continued)

*Primary Examiner*—Brian Healy
*Assistant Examiner*—Charlie Peng
(74) *Attorney, Agent, or Firm*—Rothwell Figg Ernst & Manbeck

(57) ABSTRACT

A method of and apparatus for determining the spatial distribution of polarisation properties of an optical fiber (1). Pulses (7) of light are transmitted along the optical fiber (1) and the polarisation state of light backscattered from portions e and elements R of the optical fiber (1) detected. A spatial distribution of linear retardance $\delta$, orientation of linear retardance axes q and circular retardance axes can be accurately determined. This has application in the analysis of Polarisation Mode Dispension (PMD) in telecommunications as well as, inter alia, strain, stress, temperature and electric current and voltage measurement using optical fibers.

18 Claims, 8 Drawing Sheets

OTHER PUBLICATIONS

Shatalin, S.V. et al. (1998). "Interferometric Optical Time-Domain Reflectometry for Distributed Optical-Fibre Sensing," SPIE Conference Proceedings, 43rd Intl. Conference on Optical Science, Engineering and Instrumentation, Conf. 3479, paper 3479-22, Jul. 1998.

Wuilpart, M. et al. (1999). "Theoretical study of a Polarisation-OTDR technique using a Jones approach to measure the distribution of Polarisation Mode Dispersion and of external effects in optical fibres," Proceedings Symposium IEEE/LEOS Benelux Chapter, Mons, Begium, Nov. 1999, pp. 131-134.

Rogers, A. et al. (2000). "New Polarimetry for Fully-distributed Optical-fibre Strain and Temperature Sensing," Newport Beach SPIE Conference on Smart Structures and Materials, paper 3986-42, pp. 1-11, Mar. 2000 (text only—no figures available).

Wuilpart, M. et al. (2000). "Distributed measurement of the polarisation properties of a fibre using a backscatter technique," Proceedings of Conf. on Applications of Optical Fibre Sensors, SPIE vol. 4074, Glasgow, Scotland, pp. 322-330, May 2000.

Wuilpart, M. et al. (2000). "Distributed Measurement of Polarisation Properties of a Fibre Using a Polarisation-OTDR," Proceedings of Eurocable 2000, Stuttgart, Germany, pp. 257-264, Jun. 2000.

Rogers, A.J. (2000). "Distributed measurement of strain using optical-fibre backscatter polarimetry," *Strain* 36(3):135-142, British Soc. Strain Meas. UK.

* cited by examiner

OPTICAL FIBRE BACKSCATTER POLARIMETRY

The present invention relates to optical fibre polarimetry and, in particular, to a method and apparatus for determining a spatial distribution of the polarisation properties of a waveguide or optical fibre.

Knowledge of the polarisation properties of waveguides has various uses. For example, certain polarisation properties of waveguides such as optical fibres of telecommunications systems, used to transmit signals, can lead to degradation of the transmitted signals. Such signals tend to comprise very short pulses of light. As the light pulses travel along an optical fibre, the polarisation state of the light pulses is altered by the polarisation properties of the optical fibre. This alteration of polarisation tends to result in the light pulses becoming less distinct from one another and, over large distances, e.g. tens of kilometers, for high transmission rate, e.g. 40 Gbit/sec, systems, the light pulses can become indistinguishable. This problem is known as Polarisation Mode Dispersion (PMD) and is currently considered to be a major factor limiting the rate at which signals can be transmitted through optical fibre as well as the length of optical fibres over which signals can be sent. Measurement of the polarisation properties of optical fibres is therefore useful in identifying optical fibres or parts of optical fibres in transmission systems that have high PMD so that they can be replaced or by-passed for example. Likewise, measurement of the polarisation properties of optical fibres during or after manufacture can improve manufacturing processes or quality control for example.

Other reasons that it is useful to determine the polarisation properties of optical waveguides arise due to the polarisation properties of optical fibre being influenced by external factors. For examples the polarisation properties of an optical fibre may change when the optical fibre passes through an electric or magnetic field. Knowledge of the polarisation properties or changes in polarisation properties of the optical fibre can therefore enable measurement of the external electric or magnetic field and consequently electric current or voltage. Similarly, polarisation properties of an optical fibre are influenced by physical forces applied to the optical fibre. For example, stress or strain such as twisting or bending the optical fibre changes the polarisation properties of the optical fibre and knowledge of the polarisation properties of the optical fibre can therefore provide measurement of the stress or strain. Indeed, it is even possible to measure temperature according to changes in the polarisation properties of an optical fibre, as the optical fibre can be arranged to experience strain under thermal expansion and contraction, for example.

In "Polarisation Optical Time Domain Reflectometry", Rogers A. J., Electronics Letters, 19 Jun. 1980, Vol. 16, No. 13, pp 489–490, a technique for analysing the polarisation properties of optical fibres is discussed. This technique is known as Polarisation Optical Time Domain Reflectometry (POTDR).

POTDR involves transmitting a pulse of polarised light along an optical fibre. As the light pulse travels along the optical fibre, some of the light is scattered by small imperfections and inhomogeneities in the optical fibre. Such scattering mostly occurs according to Rayleigh's Law, i.e. due to imperfections and inhomogeneties that are smaller than the wavelength of the light propagating along the optical fibre and the scattering does not, in itself, generally change the polarisation of the light. Thus, light which is scattered back along the optical fibre to the end of the optical fibre into which the light pulse was transmitted (backscattered light) has a polarisation state that can be used to deduce information regarding the polarisation properties of the optical fibre.

The polarisation properties of an optical fibre can be described completely by three quantities: linear retardance $\delta$; orientation of the linear retardance axes q; and circular retardance $\rho$. Linear retardance $\delta$ and orientation of the linear retardance axes q are independent of the direction in which light travels along the optical fibre, whilst circular retardance $\rho$ for light travelling in opposite directions along the optical fibre is equal and opposite. POTDR only therefore provides partial information regarding the polarisation properties of an optical fibre. Whilst this has certain applications, the usefulness of POTDR is therefore limited.

In "Computational Polarisation—Optical Time Domain Reflectometry for Measurement of the Spatial Distribution of PMD in Optical Fibres", Rogers A. J., Zhou, Y. R., Henderek, U. A., Proc OFMC'97, September 1997, pp 126–129, an improvement to POTDR is discussed. This improved technique is known as Computational Polarisation Optical Time Domain Reflectometry (CPOTDR).

CPOTDR involves effectively dividing the optical fibre into a series of adjacent elements starting from an end of the fibre into which light pulses are transmitted. Each element is considered to have polarisation properties that are homogeneous, i.e. constant throughout the element, and is effectively further divided into two sections. The polarisation states of light backscattered in each section of each element is determined separately and, from these polarisation states it is possible to determine the full polarisation properties, i.e. linear retardance $\delta$, orientation of the linear retardance axes q and circular retardance $\rho$, for each element of the optical fibre in turn.

However, the determination of the polarisation properties of each element of an optical fibre by CPOTDR depends on the determined polarisation properties of the preceding element, which in turn depend on the determined polarisation properties of the next preceding element and so on. CPOTDR therefore suffers from accumulation errors. In other words, the error in the determined polarisation properties of an element affects the determination of the polarisation properties of the next element along the optical fibre and so on. This limits the accuracy of CPOTDR and imposes a limit on the length of optical fibre for which polarisation properties can be determined. A limitation also arises in that the polarisation properties of the optical fibre must be determined starting with an element at the end of the optical fibre from which the light pulses are transmitted into the fibre and then for elements in turn along the optical fibre. It is not possible to start determining the polarisation properties of an element of an optical fibre part way along the optical fibre until the polarisation properties of all preceding elements are known. Furthermore, it has not previously been easily possible to determine all of the polarisation properties of an optical fibre, including in particular the orientation of linear retardance axes q.

The present invention seeks to overcome these problems and, according to an aspect of the present invention, there is provided a method of determining a spatial distribution of polarisation properties of an optical waveguide, the method comprising:

(a) transmitting pulses of polarised light along the optical waveguide from an end of the optical waveguide;

(b) detecting a first polarisation state of light emerging from the end of the optical waveguide due to backscattering between the end of the optical waveguide and an element of the optical waveguide;

(c) detecting a second polarisation state of light emerging from the end of the optical waveguide due to backscattering in a first section of the element of the optical waveguide;

(d) detecting a third polarisation state of light emerging from the end of the optical waveguide due to backscattering in a second section of the element of the optical waveguide;

(e) deducing from the first polarisation state, linear retardance $\delta_e$ and orientation of linear retardance axes $q_e$ of a retarder/rotator pair equivalent to a portion e of the optical waveguide between the end of the optical waveguide and the element;

(f) determining the polarisation properties of the element from the second polarisation state, third polarisation state, deduced linear retardance $\delta_e$ and deduced orientation of linear retardance axes $q_e$; and (g) repeating steps (a) to (f) for plural elements of the optical waveguide to collate a spatial distribution of polarisation properties of the optical waveguide, wherein the determination of polarisation properties of the elements includes determination of orientation of linear retardance axes q of the elements by:

repeating (a), (b), (c) and (d) with pulses of light each having different wavelengths;

deducing values of circular retardance of a retarder/rotator pair equivalent to a portion e of the optical waveguide between the end of the optical waveguide and each element minus orientation of the linear retardance axes of the respective element, $p_e - q$, for the pulses of light having different wavelengths; and extrapolating the calculated values, $p_e - q$, as $p_e$ tends to zero for increasing wavelength to obtain a value for orientation of the linear retardance axes q of each element.

According to another aspect of the present invention, there is provided an apparatus for determining a spatial distribution of polarisation properties of an optical waveguide, the apparatus comprising:

a light source for transmitting pulses of polarised light along the optical waveguide from an end of the optical waveguide;

a detector for detecting a first polarisation state of light emerging from the end of the optical waveguide due to backscattering between the end of the optical waveguide and an element of the optical waveguide, a second polarisation state of light emerging from the end of the optical waveguide due to backscattering in a first section of the element of the optical waveguide, and a third polarisation state of light emerging from the end of the optical waveguide due to backscattering in a second section of the element of the optical waveguide; and a processor for deducing, from the first polarisation state, linear retardance $\delta_e$ and orientation of linear retardance axes $q_e$ of a retarder/rotator pair equivalent to a portion e of the optical waveguide between the end of the optical waveguide and the element, determining the polarisation properties of the element from the first polarisation state, second polarisation state, deduced linear retardance $\delta_e$ and deduced orientation of linear retardance axes $q_e$, controlling the light source and detector to repeat the transmission and detection for plural elements of the optical waveguide, repeating the deduction and determination for the plural elements of the optical waveguide and collating a spatial distribution of polarisation properties of the optical waveguide from the determined polarisation properties of the plural elements, wherein:

the light source transmits pulses of light each having different wavelengths;

the detector detects the first, second and third polarisation for the pulses of light of different wavelengths; and the processor deduces values of circular retardance of a retarder/rotator pair equivalent to a portion e of the optical fibre between the end of the optical fibre and the element minus orientation of the linear retardance axes of the element, $p_e - q$, for the pulses of light of each different wavelength and extrapolates the calculated values, $p_e - q$, as $p_e$ tends to zero for increasing wavelength to obtain a value for orientation of the linear retardance axes of each element.

In other words, the applicant has recognised that the complete polarisation properties of any element of an optical waveguide can be determined from these deduced polarisation states of light backscattered from the optical waveguide. More specifically, the linear retardance $\delta_e$ and orientation of linear retardance axes $q_e$ of the optical waveguide between the end of the optical waveguide and the element may be deduced from only the first polarisation state. Likewise, the polarisation properties of each element of the optical waveguide may be determined from only the second polarisation state, third polarisation state, deduced linear retardance $\delta_e$ and deduced orientation of linear retardance axes $q_e$ for the respective element.

This enables a spatial distribution of the polarisation properties of all or part of an optical waveguide to be determined straightforwardly in comparison to CPOTDR and without significant accumulation errors. The overall length of optical waveguide to which the method and apparatus of the invention can be successfully applied is therefore significantly greater than that to which CPOTDR can be successfully applied. Indeed, the length of optical waveguide for which a spatial distribution of polarisation properties can be determined is only effectively limited by attenuation of backscattered light in the optical waveguide.

The invention is applicable to various optical waveguides. However, the optical waveguide may suitably be an optical fibre. In particular, the optical waveguide may be a monomode optical fibre.

The light source may transmit pulses of light having properties suitable for transmission in the particular optical waveguide under consideration. Typically, the light of the pulses may be substantially monochromatic and coherent. It may be linearly polarised. A typical wavelength of the light may be around 1550 nm or in the range 1550 nm to 1560 nm. It may therefore be convenient for the light source to comprise a laser. A light coupler may be used to direct the transmitted light into the optical waveguide.

Complete polarisation properties of the elements of the optical waveguide can be determined. For example, the determined polarisation properties of the elements may include linear retardance $\delta$, orientation of linear retardance axes q and circular retardance $\rho$. Alternatively, the polarisation properties of the elements or the spatial distribution of polarisation properties of the optical waveguide can be expressed in other forms, such as a matrix or matrices, or graphically. Not all the polarisation properties of an element need therefore be calculated. The advantage of the invention lies in the ability to determine any desired polarisation properties of the optical waveguide or an element of the optical waveguide without accumulation errors.

The determination of polarisation properties of the elements can be adapted to extract the desired polarisation properties in a convenient and efficient manner. For example, by omitting calculations that relate only to undesired polarisation properties. However, where it is desired to determine the orientation of linear retardance axes q, it is preferred that this is achieved by:

repeating (a) to (d) with pulses of light having different wavelengths;

deducing values of circular retardance of the optical waveguide between the end of the optical fibre and each element minus orientation of the linear retardances axes of the respective element, $\rho_e$–q, for the pulses of light having different wavelengths; and extrapolating, for each element, the calculated values, $\rho_e$–q as $\rho_e$ tends to zero for increasing wavelength to obtain a value for orientation of the linear retardance axes q.

In other words, it is preferred that the light source transmits pulses of light having different wavelengths;

the detector detects the first, second and third polarisation states for the pulses of light having different wavelengths; and the processor deduces values of circular retardance of the optical waveguide between the end of the optical waveguide and each element minus orientation of the linear retardance axes of the respective element, $\rho_e$–q, for the pulses of light having the different wavelength and extrapolates, for each element, the calculated values, $\rho_e$–q as $\rho_e$ tends to zero for increasing wavelength to obtain a value for orientation of the linear retardance axes q.

The method and apparatus of the invention are convenient as there is no physical distinction between circular retardance $\rho_e$ of the optical waveguide between the end of the optical waveguide and each element and orientation of the linear retardance axes q of the respective element. It is therefore more straightforward to extrapolate orientation of the linear retardances axes q by determining circular retardance of the optical waveguide between the end of the optical waveguide and each element minus orientation of the linear retardance axes of the respective element, $\rho_e$–q, for different wavelengths of light.

The different wavelengths of light of the light pulses may be selected as desired. Preferably, at least three different wavelengths, or three pulses having different wavelengths of light, are transmitted for each element in order to provide accurate extrapolation. In particular, pulses having wavelengths of light varying from 1500 nm to 1560 nm may be transmitted for each element. The light source may therefore conveniently comprise a tuneable laser.

The first polarisation state may be that of light emerging from the end of the optical waveguide due to backscattering substantially at an end of the element closest to the end of the optical waveguide into which the light pulses are transmitted.

The first and second sections may be substantially adjacent. They may be substantially equal in length along the major axis of the optical waveguide. Indeed, the first and second sections of the element may together define the element.

Preferred embodiments of the present invention will now be described, by way of example only, with reference to the accompanying drawings, in which.

The invention is applicable to various types of waveguide and in particular to any optical waveguide that provides mono-mode transmission of light. Whilst the examples below are described with reference to an optical fibre, these examples can be extended to application in other optical waveguides when applicable.

Figure 1:
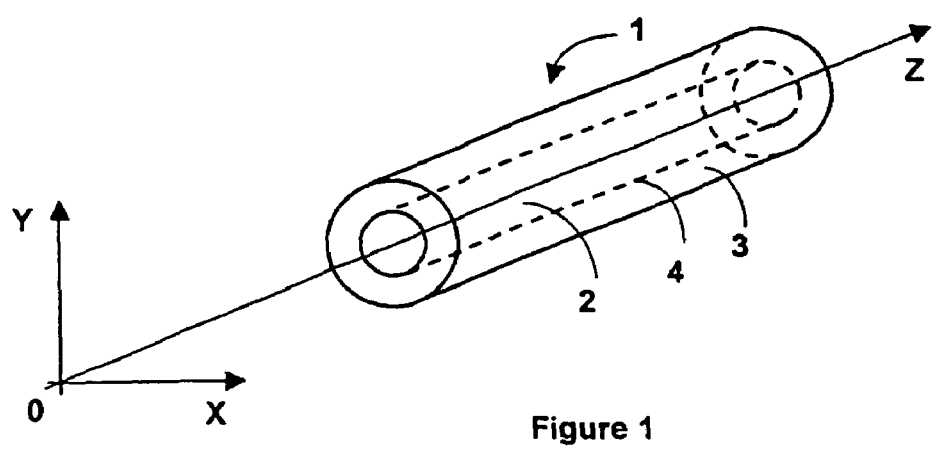
FIG. 1 is a perspective view of an optical fibre.
Figure 2:
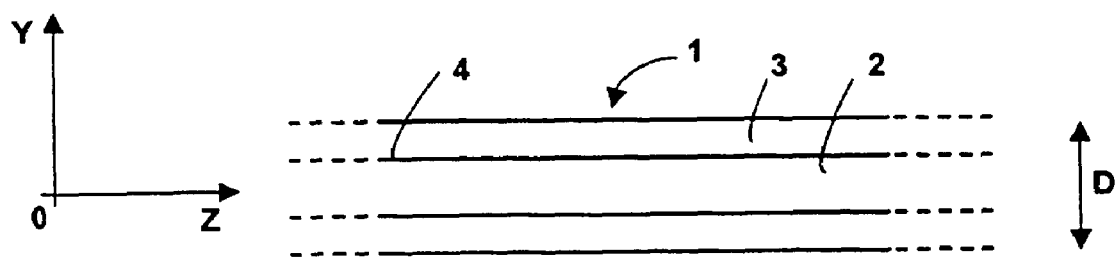
FIG. 2 is a longitudinal, sectional view of the optical fibre of FIG. 1.
Figure 3:
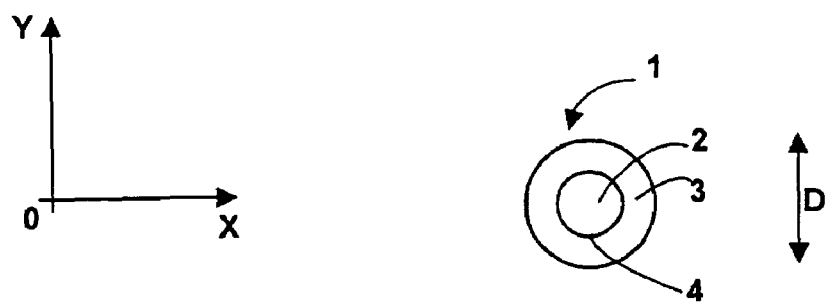
FIG. 3 is a transverse, sectional view of the optical fibre of FIG. 1.

Referring to FIGS. 1 to 3, an optical fibre 1 is an optical fibre comprising a core 2, which might be cylindrical and made from silica (i.e. glass) or another highly optically transmissive material, and a cladding 3 which generally encloses the circumference of the core 2 along the length of the optical waveguide 1. A typical diameter D for the optical fibre 1 might be 100 μm. The core 2 has a refractive index $n_{cr}$ and the cladding 3 has a refractive index $n_{cl}$. The refractive index $n_{cr}$ of the core 2 is greater than the refractive index $n_{cl}$ of the cladding 3, i.e. $n_{cr} > n_{cl}$, such that light passing generally along the length of the core 2 is totally internally reflected in the core 2 at a boundary 4 between the core 2 and cladding 3.

In this example, the geometry and refractive indices $n_{cr}$ and $n_{cl}$ of the core 2 and cladding 3 are selected such that only one reflection angle θ at the boundary 4 between the core 2 and cladding 3 results in the propagation of light of wavelength λ along the optical fibre 1. More specifically, $$\frac{\pi D}{\lambda}(n_{cr}^2 - n_{cr}^2)^{\frac{1}{2}} \leq 2.405$$

Such an optical fibre 1 is said to transmit light of wavelength λ in a "single-mode" or "mono-mode". This is well known in the art and the features of such fibres will not therefore be described in detail.

One characteristic of such mono-mode propagation of light is that, at any point along the length of the optical fibre 1, light has a single polarisation state. In other words, due to the propagation characteristics of the optical fibre 1, light passing from one point along the length of the optical fibre 1 to another point along the length of the optical fibre 1 travels substantially the same distance. This has the result that the polarisation state of light at any given point along the optical fibre 1 is singular and definite rather than comprised of plural polarisation states.

However, the polarisation state of light varies from point to point along the length of the optical fibre 1 due to the polarisation properties of the optical fibre 1. In an ideal optical fibre, the change in polarisation of light as it passes along the fibre might be constant. In practice, the change in polarisation of light as it passes along the optical fibre 1 varies and is dependent on a number of factors. In particular, bends, twists and inhomogeneities in the optical fibre 1 and in particular the shape of the core 2 cause varying changes in polarisation. External influences, such as stress, magnetic fields, electric fields and radiation, can also affect the change in polarisation of light passing along the optical fibre 1.

Figure 4:
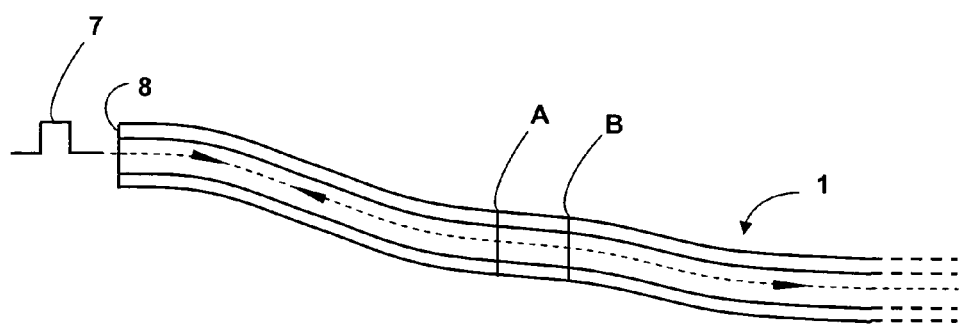
FIG. 4 is a longitudinal, sectional view of the optical fibre illustrating Polarisation Optical Time Domain Reflectometry.

In more detail, light propagates along a mono-mode optical fibre with two polarisation modes, which may be thought of as orthogonal ellipses 5, 6, for example as illustrated in FIG. 4. Each ellipse 5, 6 is effectively the locus of points mapped by the electric field vector of light propagating in the respective mode over a single wavelength of the light. As light propagates along the mono-mode optical fibre 1, the shape of the ellipses changes due to the polarisation properties of the optical fibre 1.

One polarisation property exhibited by the optical fibre 1 is linear birefringence. Linear birefringence may result from, inter alia, the core 2 not being perfectly circular. In other words, slight ellipticity of the core 2 can result in linear birefringence. Linear birefringence can be thought of as causing the major axes of the ellipses 5, 6, i.e. the linear polarisation component of each polarisation mode, to propagate at different velocities. This results in the generation of a phase difference between the linear polarisation component of each polarisation mode over a given length of the optical fibre 1, which phase difference is referred to as linear retardance $\delta$. In order to fully define the linear birefringence of the optical fibre 1, it is also necessary to consider by how much the major axis of at least one of the ellipses 5, 6 or linear polarisation components of the polarisation modes rotate over a given length of the optical fibre 1 and this is referred to as the orientation of linear retardance axes q.

Another polarisation characteristic exhibited by the optical fibre 1 is circular birefringence. Circular birefringence may result from, inter alia, axial twists in the core 2. Circular birefringence can be thought of as causing the degree of ellipticity of the ellipses 5, 6, i.e. the circular component of the each polarisation mode, to propagate along the optical fibre at different velocities. The difference in the velocity of propagation of the circular components of each polarisation mode is referred to as circular retardance $\rho$.

Linear retardance $\delta$, orientation of the linear retardance axes q and circular retardance $\rho$ fully define the polarisation properties of a given length of the optical fibre 1. It is therefore desired to be able to determine these parameters in order to assess the polarisation properties of the optical fibre 1.

In the prior art, Polarisation Optical Time Domain Reflectometry (POTDR) has been used with some success to measure the polarisation properties of a mono-mode optical fibre. Such a method is described in "Polarisation Optical Time Domain Reflectometry", Rogers, A. J., Electronics Letters, 19 Jun. 1980, Vol 16, No. 13, pp 489–490.

Figure 5:
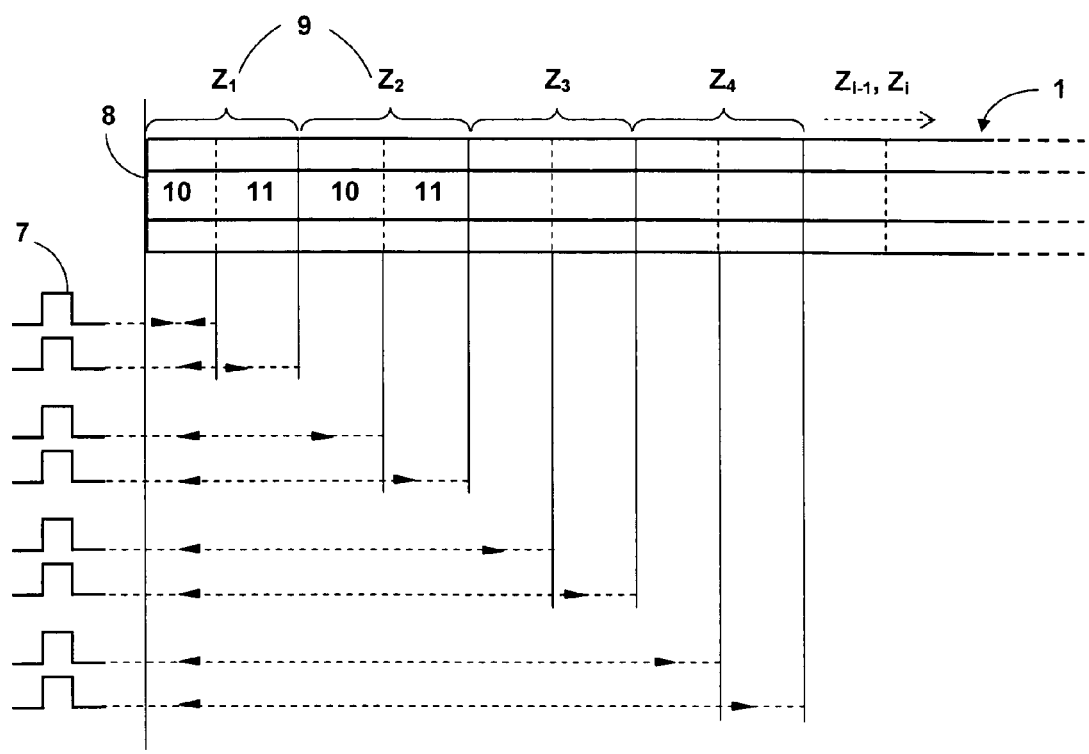
FIG. 5 is a longitudinal, sectional view of an optical fibre illustrating Computational Polarisation Optical Time Domain Reflectometry.

Briefly, referring to FIG. 5, a pulse 7 of light is transmitted along the optical fibre 1 (in a forward direction) by transmitting the pulse 7 of the light into the optical fibre at end 8 of the optical fibre 1. As the pulse 7 of light passes along the optical fibre 1 small imperfections or inhomogeneities in the optical fibre 1 cause the light to be reflected or scattered according to Rayleigh's Law. Some of this scattered light returns along the optical fibre 1, emerges from the end 8 of the optical fibre 1 and can be detected. Rayleigh scattering does not affect the polarization of the light and the light returning along the fibre therefore carries information regarding the polarization characteristics of the optical fibre 1 up to the point at which the scattering took place.

Light backscattered at a first axial position A along the optical fibre 1 will return to the end 8 of the optical fibre 1 at a first time $t_1$. Light reflected at a second axial position B along the optical fibre 1 will return to the end 8 of the optical fibre 1 at a second, later time $t_2$. Thus, by analysing the polarization state of light emerging from the end 8 of the optical fibre 1 at the first and second times $t_1$, $t_2$, information regarding the polarization properties of the optical fibre 1 between the points A and B can be determined.

However, whilst linear birefringence is independent of the direction in which light is travelling along the optical fibre 1, circular birefringence is not. Indeed, circular birefringence in one direction along the optical fibre 1 is equal and opposite to circular birefringence in the opposite direction along the optical fibre 1.

Computational Polarization Optical Time Domain Reflectometry (CPOTDR) was developed in order to overcome this limitation. CPOTDR is described, for example, in "Computational Polarization-Optical Time Domain Reflectometry for Measurement of the Spatial Distribution of PMD in Optical Fibres", Rogers A. J., Zhou Y. R. and Henderek V. A., Proc.OFMC '97, September 1997, pp 126–129.

Figure 6:
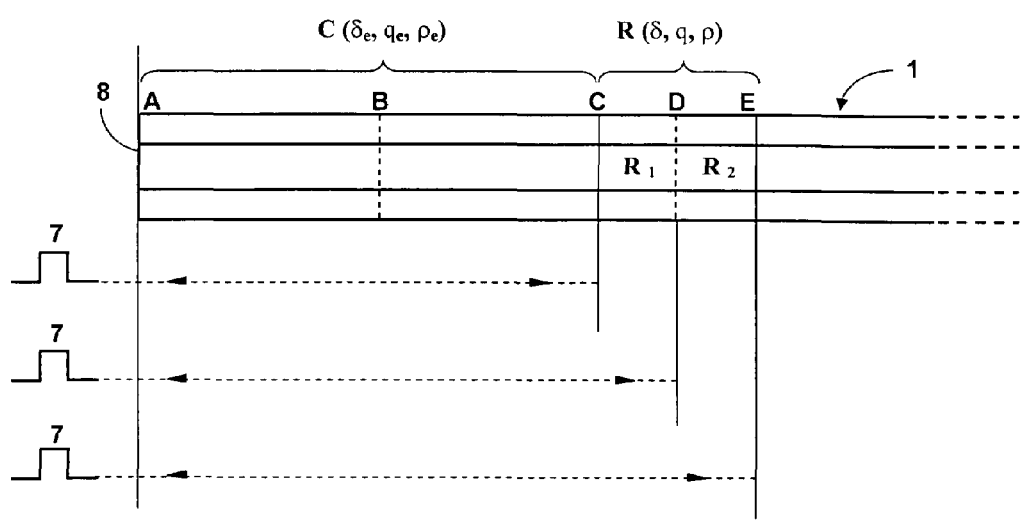
FIG. 6 is a longitudinal, sectional view of an optical fibre illustrating a method of determining the spatial distribution of polarisation properties of an optical fibre according to the invention.

Briefly, referring to FIG. 6, in CPOTDR, the optical fibre 1 is considered as a series of elements $Z_1$ to $Z_i$ in FIG. 6, with element $Z_1$ being adjacent the end 8 of the optical fibre 1. The elements $Z_1$ to $Z_i$ each have the same axial length along the optical fibre 1 and are adjacent one another. Each element 9 has linear retardance $\delta_i$, orientation of linear retardance axes $q_i$ and circular retardance $\rho_i$. Pulses 7 of light are transmitted along the optical fibre 1 (in a forward direction) and the backscattered light analysed in a manner similar to POTDR.

In CPOTDR, the elements $Z_1$ to $Z_i$ are effectively divided into two equal sections 10, 11. The polarisation state of light backscattered in each section of each element $Z_1$ to $Z_i$ is detected at end 8 of the optical waveguide 1, as illustrated in FIG. 6. A Jones matrix can be used to describe the polarisation properties of each element $Z_1$ to $Z_i$ of the optical waveguide 1. The change of polarisation of light propagating forward and then backscattered through each section 10, 11 of each element $Z_1$ to $Z_i$ is determined by the product of the relevant Jones matrices. Starting from the end 8 of the optical section 1, these successive products are shown as:

$$M_1^T M_1 \qquad (1)$$

$$(M_1 M_1')^T (M_1 M_1')$$

$$(M_2 M_1 M_1')^T (M_2 M_1 M_1')$$

$$(M_2 M_2' M_1 M_1')^T (M_2 M_2' M_1 M_1')$$

$$\vdots$$

$$(M_i M_i' \ldots M_1 M_1')^T (M_i M_i' \ldots M_1 M_1') =$$

$$M_1^T M_1'^T \ldots M_i'^T M_i^T M_i M_i' \ldots M_1' M_1$$

Where $M_i$ is the Jones matrix of the first section 10 of each element $Z_i$ and $M_i^T$ is its transpose and $M_i'$ is the Jones matrix of the second section 11 of each element $Z_i$ and $M_i'^T$ its transpose. These matrix products can be derived from detection of the polarisation characteristics of backscattered light emerging from end 8 of the optical fibre 1. The Jones matrix for an element $Z_1$ to $Z_i$ with both linear and circular birefringence has the form:

$$M = \begin{pmatrix} \alpha + i\beta\cos(2q) & -\gamma + i\beta\sin(2q) \\ \gamma + i\beta\sin(2q) & \alpha - i\beta\cos(2q) \end{pmatrix}$$

$$\alpha = \cos\Delta, \quad \beta = \frac{\delta}{2}\left(\frac{\sin\Delta}{\Delta}\right), \quad \gamma = P\frac{\sin\Delta}{\Delta}$$

with $$\Delta = \left(\rho^2 + \frac{\delta^2}{4}\right)^{\frac{1}{2}} \text{ and } \alpha^2 + \beta^2 + \gamma^2 1 \quad (2)$$

The product of the form $M^T M$ is equivalent to a linear retarder and has the general form:

$$\begin{pmatrix} A + iB & iC \\ iC & A - iB \end{pmatrix}$$

where $A^2 + B^2 + C^2 = 1$ $A = \alpha^2 + \gamma^2 - \beta^2$ $B = 2\beta(\alpha \cos(2q) - \gamma \sin(2q))$ $C = 2\beta(\alpha \sin(2q) + \gamma \cos(2q))$ \quad (3)

In equations (3), we see that there are only two independent equations for the three unknowns. However, as mentioned before, each element is effectively divided into two sections 10, 11. When the product $M_i^T M_i$ for the first section and $M_i'^T M_i'$ for the second section 11 of an element $Z_i$ are known, equations (3) show that four independent equations are then available for the three parameters $\delta_i$, $q_i$ and $\rho_i$. By solving these equations, the Jones matrix of the element $Z_i$ can be found. In other words $\delta_i$, $q_i$ and $\rho_i$ can be determined.

However, from equations (1) it is seen that only for the first element $Z_1$ are the products $M_1^T M_1$ and $(M_1 M_1')^T (M_1 M_1')$ obtained directly. For the succeeding elements $Z_i$, the products for each element $Z_i$ are obtained by using the calculated Jones matrices for the preceding elements $Z_1$ to $Z_{i-1}$. Therefore, the accuracy of the calculated parameters $\delta_i$, $q_i$ and $\rho_i$ depends on the calculation accuracy of the parameters for the preceding elements $Z_1$ to $Z_{i-1}$.

Figure 7:
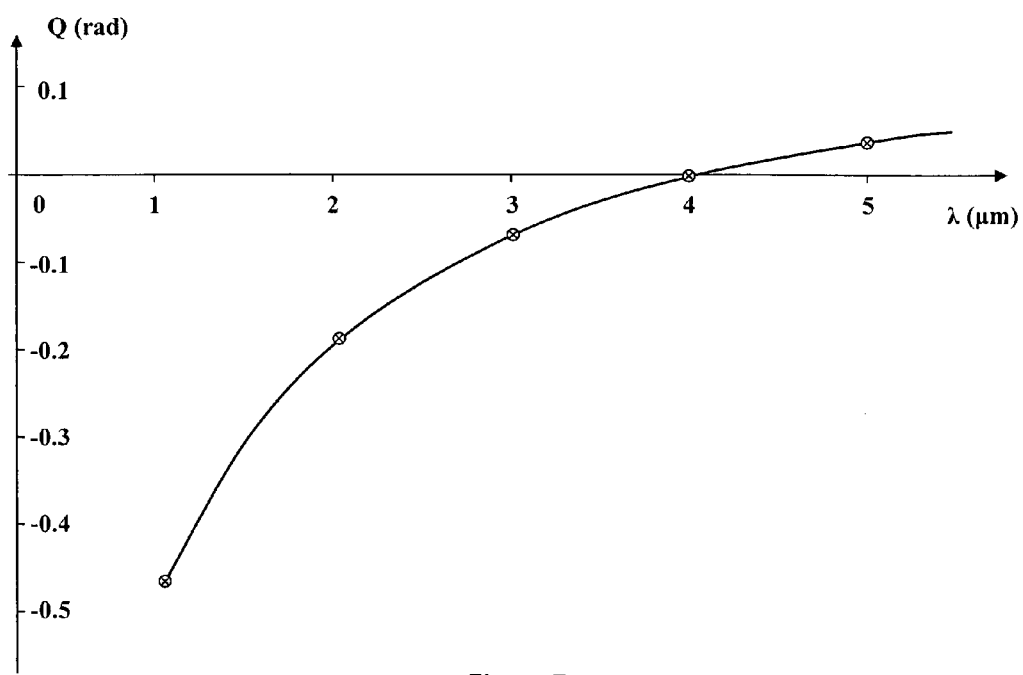
FIG. 7 is a graphical illustration of a determination of orientation of linear retardance axes q according to the invention.

Referring to FIG. 7, in a method of determining the spatial distribution of polarization characteristics of the optical fibre 1 according to the invention, the optical fibre 1 is considered as a series of discrete elements R in which the polarization properties of the optical fibre 1 are considered to be homogeneous. Each element R is, in turn, considered as two adjacent sections R1, R2 of equal size, although in other examples, the elements R may be divided into a different number of other size sections as desired. The element R is considered to have polarization characteristics, to be determined, comprising linear retardance $\delta$, orientation of the linear retardance axes q and circular retardance p.

Conveniently, the portion e of the optical fibre 1 can be considered as a retarder-rotator pair. In other words, half of the portion e can be considered to have polarization properties comprising only the linear retardance $\delta_e$ and orientation of the linear retardance axes $q_e$ and the other half of the portion e can be considered to have polarization properties comprising only circular retardance $\rho_e$. So, the linear retardance $\delta_e$ of the portion e and the orientation of the linear retardance areas $q_e$ of portion e can be deduced directly from the polarisation state of light backscattered from point C to the end 8 of the optical fibre 1.

As for CPOTDR, it is possible to derive the Jones matrix products $M_{R1}^T M_{R1}$ and $M_{R2}^T M_{R2}$ from detection of the polarisation slate of backscattered light emerging from the end of the optical waveguide 1. Equations (3) therefore show that we from $M_{R1}^T M_{R1}$ and $M_{R2}^T M_{R2}$ have four independent equations for the four parameters $\delta$, q, $\rho$ and $\rho_e$. By solving these equations, the Jones matrix $M_R$ of element R and $\delta$, q and p can be found.

Figure 8:
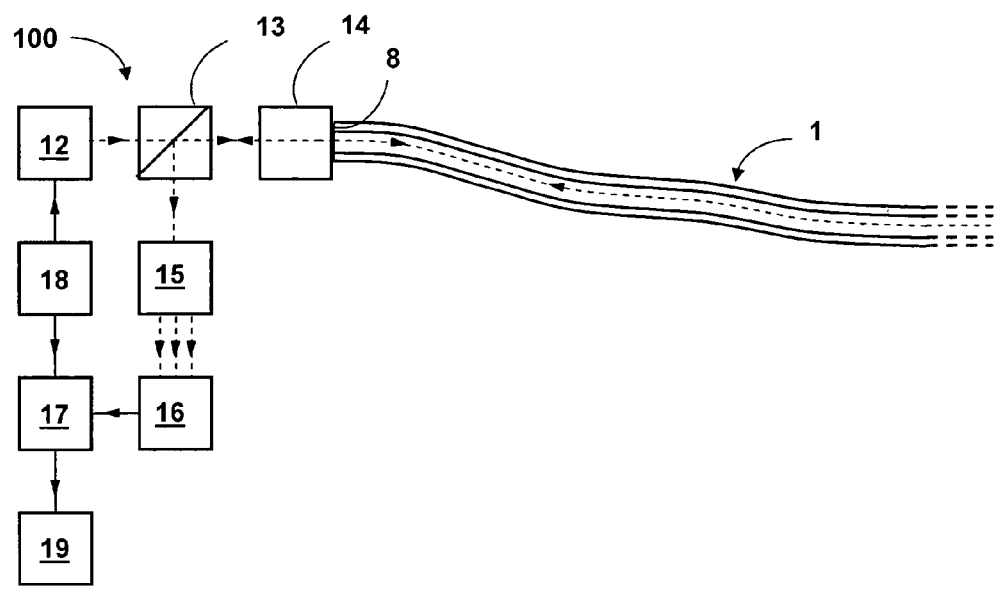
FIG. 8 is a schematic illustration of an apparatus for determining the spatial distribution of polarisation properties of an optical fibre according to the invention.

However, there is no physical distinction between circular retardance $\rho_e$ and orientation of the linear retardance axes q, and $Q = (\rho_e - q)$ is the parameter that is directly calculable, although, in other examples, $(\rho_e + q)$ might be calculated. Circular retardance $\rho_e$ depends on the wavelength $\lambda$ of light, whilst orientation of the linear retardance axes q does not. Furthermore, circular retardance $\rho_e(\lambda)$ decreases to zero as wavelength $\lambda$ increases to infinity. Referring to FIG. 8, it is therefore possible to calculate $Q(\lambda)$ for light pulses of different wavelengths $\lambda$ and extrapolate a value for orientation of the linear retardance axes q.

Figure 9:
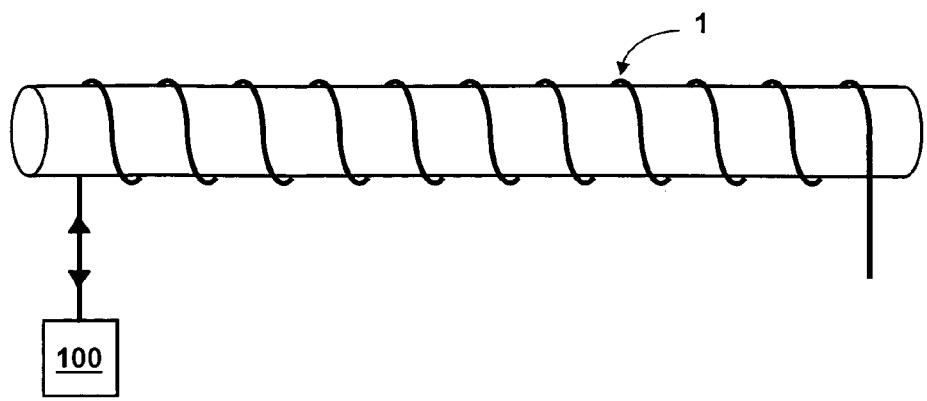
FIG. 9 is an illustration of an optical fibre arranged for temperature measurement according to the invention.

Referring to FIG. 9, an apparatus 100 for determining the spatial distribution of polarisation properties of an optical fibre comprises a light source 12, which, in this example, is a tunable laser able to transmit polarised, coherent light of any desired wavelength between 1550 nm and 1560 nm. Light transmitted by the light source 12 is directed into a beamsplitter 13. The beamsplitter 13 transmits some of the light incident on it from the light source 12 to an optical coupler 14, in this example by admitting the light to pass straight through the beam splitter 13. Some of the light incident from the light source 12 is also transmitted to a polarisation analyser 15, in this example by reflecting the light through an angle of 90°.

The optical coupler 14 passes light incident on it from the beamsplitter 13 into the optical fibre 1 through the end 8 of the optical fibre 1. The optical coupler 14 also transmits light emitted from the end 8 of the optical fibre 1, for example by backscattering in the optical fibre 1, to the beamsplitter 13. This emitted, e.g. backscattered, light is re-directed by the beamsplitter 13 to the polarisation analyser 15.

The polarisation analyser 15 comprises a Stokes analyser. More specifically, the polarisation analyser 15 has four optical elements arranged in the path of the light re-directed from the beamsplitter 13. The optical elements comprise, in series, a first linear polariser, a second linear polariser arranged at 45° to the first linear polariser, a quarter wave plate, i.e. an optical element that retards light by quarter of a wavelength, and a third linear polariser arranged at the same orientation as the second linear polariser. Light emerging from each of the linear polarisers is incident on a photodetector 16, such as photodiode array. Thus, the intensity of the light of each polarisation state separated by the linear polarisers is detected by the photodetector 16.

The intensity information is output by the photodetector 16 to a processor 17, such as the Central Processing Unit (CPU) of a Personal Computer (PC). The processor 17 is able to formulate the output of the photodetector 16 in the Stokes Formalism which represents the polarisation state of light emitted from the end 8 of the optical fibre 1. The Stokes Formalism allows a Mueller matrix of the general form:

$$M_r = \begin{pmatrix} 1 & 0 & 0 & 0 \\ 0 & A_R^2 + B_R^2 - C_R^2 & 2B_R C_R & -2A_R C_R \\ 0 & 2B_R C_R & A_R^2 + C_R^2 - B_R^2 & 2A_R B_R \\ 0 & 2A_R C_R & -2A_R B_R & -A_R^2 - B_R^2 - C_R^2 \end{pmatrix}$$

It is possible to determine the Jones matrices and linear retardance δ orientation of linear retardance axes q and circular retardance ρ from the Mueller matrices of light backscattered in the optical fibre 1 as set out above.

The processor 17 is connected to a light source controller 18 for controlling the light source 12. The light source controller 18 is operable to select the wavelength at which light is transmitted by the light source 12 and the light pulse 7 timing and duration. The timing and duration of the light pulses 7 transmitted by the light source 12 can be verified by the processor 17 from the output of the photodetector 16 corresponding to light transmitted from the beamsplitter 13 to the polarisation analyser 15 from light incident on the beamsplitter 13 from the light source 12.

The timing and duration of the pulses 7 of light emitted by the light source 12 controlled, in combination with the time at which the output of the photodetector 16 is analysed, to resolve light backscattered in appropriate parts of the optical fibre 1, as described above. Thus, different elements R of the optical fibre 1 can be resolved.

The output of the processor 17 is transmitted to an output device 19 which, in this example, is a display such as an oscilloscope or other Cathode Ray Tube (CRT) monitor. The output is indicative of the determined polarisation properties at the optical fibre 1.

In a first example, the apparatus 100 is adapted to measure Polarisation Mode Dispersion in a telecommunications system. The optical coupler 14 is adapted to transmit light into telecommunications optical fibres for testing, either in situ or during or after manufacture. The output is indicative of a spatial distribution of PMD along the fibre on test and enables fibres or part of fibres having anomalously large PMD to be identified and, e.g., discarded.

Figure 10:
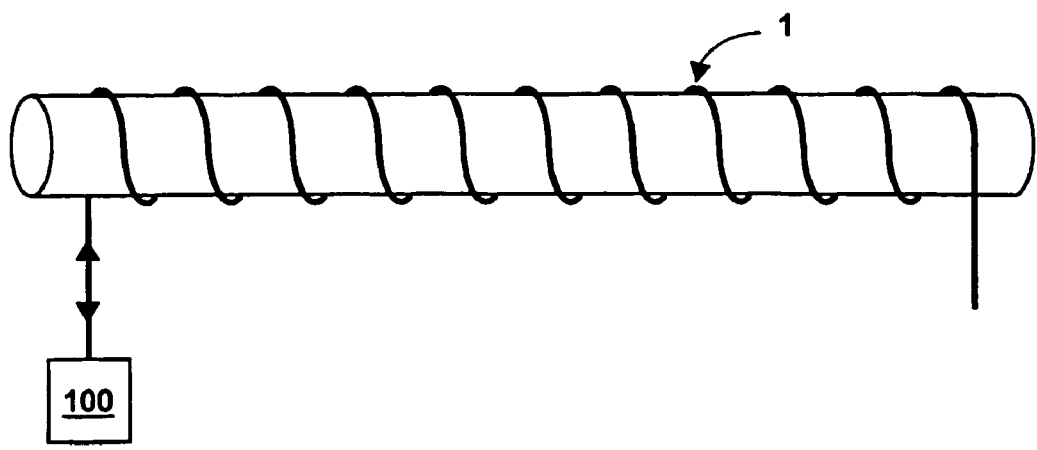

In a second example, referring to FIG. 10, the optical fibre 1 is wound into a uniform helix. The strain along the length of the optical fibre 1 is therefore substantially uniform. The apparatus 100 is adapted to measure the spatial distribution of polarisation properties of the optical fibre 1 from time to time. The change in the distribution of polarisation properties of the optical fibre 1 is indicative of changes in strain in respective parts of the fibre which, in turn, is indicative of changes in temperature at those parts causing thermal expansion or contraction of the optical fibre. Thus, after calibration, the apparatus 100 is able to output a spatial distribution of temperature along the length of the optical fibre 1.

Changes in bending of the optical fibre 1 generally cause changes in linear retardance δ and orientation of linear retardances axes q. Changes in twisting of the optical fibre 1 generally cause changes in circular retardance ρ. In another example, the apparatus 100 therefore correlates linear retardance δ and orientation of linear retardance axes q with circular retardance to provide a more accurate spatial distribution of temperature along the length of the optical fibre 1.

In "Optical-Fibre Current Measurement", Rogers, A. J., Optical-Fibre Sensing Technology, Chapman and Hall (Edited by Grattan and Meggitt) 1995, Chapter 13B pp 421–440, a method of measuring current flowing through a loop of optical fibre is described. In another example of the invention, the apparatus 100 is adapted to improve this technique.

In this example, the optical fibre 1 is formed in a loop with an electric current to be measured passing axially through the loop. This arrangement results in the magnetic field generated by the electric current passing along the loop of optical fibre 1 axially. This induces a non-reciprocal circular retardance ρ in the optical fibre 1 by the Faraday magneto-optic effect.

Measurement of circular retardance ρ therefore provides a measurement of current. However, in the prior art, vibrationally-induced linear retardance δ and orientation of linear retardances axes q interfere with measurement of circular retardance ρ. The spatial distribution of polarisation properties output by the apparatus 100 can separate linear retardance δ and orientation of linear retardance axes q from circular retardance ρ and a more accurate measurement of current is therefore produced.

In yet another example, the optical fibre 1 is arranged such that an electric field induces a linear birefringence in this optical fibre 1. The apparatus 100 determines a spatial distribution of the polarisation properties of the optical fibre 1 that is indicative of the electric field acting on the fibre. Integration of the electric field between two points along the fibre yields a measurement of voltage between the two points. Vibrational effects can be discriminated against by knowledge of the electric field direction(s) or frequency discrimination. In combination with the example set out above, both electric current and electric voltage can be measured by apparatus 100.

In another example, the optical fibre 1 is arranged to undergo the same strain as a structure, the strain on which it is desired to measure. For example, the optical fibre 1 may be embedded in a reinforced concrete slab of a building or bridge. As strain on the optical fibre 1 changes the spatial distribution of polarisation properties of the optical fibre 1, measured by apparatus 100, changes. Thus, a spatial distribution of the strain or stress on the structure can be determined.

The invention claimed is:

1. A method of determining a spatial distribution of polarisation properties of an optical waveguide, the method comprising:

(a) transmitting pulses of polarised light along the optical waveguide from an end of the optical waveguide;

(b) detecting a first polarisation state of light emerging from the end of the optical waveguide due to backscattering in the optical waveguide between the end of the optical waveguide and an element of the optical waveguide;

(c) detecting a second polarisation state of light that emerges from the end of the optical waveguide due to backscattering in a first section of the element of the optical waveguide;

(d) detecting a third polarisation state of light that emerges from the end of the optical waveguide due to backscattering in a second section of the element of the optical waveguide;

(e) deducing, from the first polarisation state, linear retardance $δ_e$ and orientation of linear retardance axes $q_e$ of a retarder/rotator pair equivalent to a portion e of the optical waveguide between end of the optical waveguide and the element;

(f) determining the polarisation properties of the element from the second polarisation state, third polarisation state, deduced linear retardance $\delta_e$ and deduced orientation of linear retardance axes $q_e$; and (g) repeating steps (a) to (f) for plural elements of the optical waveguide to collate a spatial distribution of polarisation properties of the optical waveguide, wherein the determination of polarisation properties of the elements includes determination of orientation of linear retardance axes of the elements by:

repeating (a), (b), (c) and (d) with pulses of light each having different wavelengths;

deducing values of circular retardance of a retarder/rotator pair equivalent to a portion e of the optical waveguide between the end of the optical waveguide and each element minus orientation of the linear retardance axes of the respective element, $p_e$–q, for the pulses of light having different wavelengths; and extrapolating the calculated values, $p_e$–q, as $p_e$ tends to zero for increasing wavelength to obtain a value for orientation of the linear retardance axes q of each element.

2. The method of claim 1, wherein the determined polarisation properties of the elements include linear retardance δ, orientation of linear retardance axes q and circular retardance ρ of the elements.

3. The method of claim 1, wherein the optical waveguide is an optical fibre.

4. The method of claim 1, wherein the optical waveguide is a mono-mode optical fibre.

5. The method of claim 1, wherein the first detected polarisation state is that of light backscattered substantially at the end of the element closest to the end of the optical waveguide.

6. The method of claim 1, wherein the first and second sections of the element are substantially adjacent.

7. The method of claim 1, wherein the first and second sections of the element are substantially equal in length along the major axis of the optical waveguide.

8. The method of claim 1, wherein the first and second sections of the element together define the element.

9. An apparatus for determining a spatial distribution of polarisation properties of an optical waveguide, the apparatus comprising:

a light source for transmitting pulses of polarised light along the optical waveguide from an end of the optical waveguide;

a detector for detecting a first polarisation state of light emerging from the end of the optical waveguide due to backscattering in the optical waveguide between the end of the optical waveguide and an element of the optical waveguide, a second polarisation state of light that emerges from the end of the optical waveguide due to backscattering in a first section of the element of the optical waveguide, and a third polarisation state of light that emerges from the end of the optical waveguide due to backscattering in a second section of the element of the optical waveguide; and a processor for deducing, from the first polarisation state, linear retardance $\delta^e$ and orientation of linear retardance axes $q_e$ of a retarder/rotator pair equivalent to a portion e of the optical waveguide between end of the optical waveguide and the element, determining the polarisation properties of the element from the first polarisation state, second polarisation state, deduced linear retardance $\delta_e$ and deduced orientation of linear retardance axes $q_e$, controlling the light source and detector to repeat the transmission and detection for plural elements of the optical waveguide, repeating the deduction and determination for the plural elements of the optical waveguide and collating a spatial distribution of polarisation properties of the optical waveguide, wherein:

the light source transmits pulses of light each having different wavelengths;

the detector detects the first, second and third polarisation for the pulses of light of different wavelengths; and the processor deduces values of circular retardance of a retarder/rotator pair equivalent to a portion e of the optical fibre between the end of the optical fibre and the element minus orientation of the linear retardance axes of the element, $p_e$ –q, for the pulses of light of each different wavelength and extrapolates the calculated values, $p_e$ –q, as $p_e$ tends to zero for increasing wavelength to obtain a value for orientation of the linear retardance axes q of each element.

10. A method of determining Polarisation Mode Dispersion (PMD) in an optical fibre comprising the method of claim 1.

11. An apparatus for determining Polarisation Mode Dispersion in an optical fibre comprising the apparatus of claim 9.

12. A method of determining changes in the polarisation properties of an optical fibre due to external influences, the method comprising the method of claim 1.

13. An apparatus for determining changes in the polarisation properties of an optical fibre due to external influences, the apparatus comprising the apparatus of claim 9.

14. Computer software adapted to carry out the method of claim 1.

15. The method of claim 2, wherein the optical waveguide is a mono-mode optical fibre.

16. The method of claim 2, wherein the optical waveguide is a mono-mode optical fibre.

17. Computer software adapted to carry out the method of claim 10.

18. Computer software adapted to carry out the method of claim 12.

* * * * *